(12) United States Patent
Tsai

(10) Patent No.: US 7,341,826 B2
(45) Date of Patent: Mar. 11, 2008

(54) METHOD FOR FABRICATING A PATTERNED CORE FOR A LIGHT GUIDE PLATE

(75) Inventor: Kun-Jung Tsai, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 621 days.

(21) Appl. No.: 10/863,174

(22) Filed: Jun. 7, 2004

(65) Prior Publication Data
US 2004/0248049 A1 Dec. 9, 2004

(30) Foreign Application Priority Data
Jun. 6, 2003 (TW) ............................... 92115468 A

(51) Int. Cl.
*G03F 7/00* (2006.01)
(52) U.S. Cl. .......................................... 430/321; 216/24
(58) Field of Classification Search .................... None
See application file for complete search history.

(56) References Cited

U.S. PATENT DOCUMENTS 6,207,247 B1 * 3/2001 Morita ....................... 428/64.1

FOREIGN PATENT DOCUMENTS

JP 2001-052519 A * 2/2007

* cited by examiner

*Primary Examiner*—John A. McPherson
(74) *Attorney, Agent, or Firm*—Wei Te Chung

(57) ABSTRACT

A method for fabricating a patterned core for a light guide plate includes: providing a substrate (500); coating a photo-resist layer (600) on the substrate; exposing the photo-resist layer to light using a photo-mask (700), the photo-mask having patterns, wherein a line-width of each pattern is less than that of a corresponding pattern of the patterned core; developing the photo-resist layer; wet etching the substrate; and removing remaining photo-resist from the substrate. Because of the isotropic directionality of the wet etching, the horizontal component of the etching can appreciably enlarge a horizontal dimension of each etched area, thereby compensating for the difference in size between each pattern of the photo-mask and the corresponding pattern of the finished core. Thus, only one semiconductor process having an exposing, a developing and an etching step is needed to fabricate the core having fine patterns. The method is relatively simple, and reduces operating costs.

9 Claims, 6 Drawing Sheets

METHOD FOR FABRICATING A PATTERNED CORE FOR A LIGHT GUIDE PLATE

BACKGROUND OF THE INVENTION

1. Field of the Invention

The present invention relates to methods for fabricating cores for light guide plates used in liquid crystal display (LCD) devices, and more particularly to a method for fabricating a core that has concentric double-circle patterns.

2. Description of Prior Art

A liquid crystal display is capable of displaying a clear and sharp image through millions of pixels of image elements. It has thus been applied to various electronic equipment in which messages or pictures need to be displayed, such as mobile phones and notebook computers. However, liquid crystals in the liquid crystal display do not themselves emit light. Rather, the liquid crystals have to be lit up by a light source so as to clearly and sharply display text and images. The light source may be ambient light, or part of a backlight system attached to the liquid crystal display.

A conventional backlight system generally comprises a plurality of components, such as a light source, a reflective plate, a light guide plate, a diffusion plate and a prism layer. Among these components, it is generally believed that the light guide plate is the most crucial component in determining the performance of the backlight system. The light guide plate serves as an instrument for receiving light beams from the light source, and for evenly distributing the light beams over the entire light guide plate through reflection and diffusion. In order to keep light evenly distributed over an entire surface of the associated liquid crystal display, the diffusion plate is generally arranged on top of the light guide plate.

FIGS. 7-12 show successive stages in a conventional method for fabricating a patterned core for a light guide plate, the core having concentric double-circle patterns. The method includes the following steps:

Referring to FIGS. 7 and 8, the initial steps are: providing a substrate 100, and coating a uniform photo-resist layer 200 on the substrate 100; exposing the photo-resist layer 200 using a photo-mask 300, the photo-mask 300 having a plurality of circular transparent areas 320 and a light shielding area 340; and performing a developing step in order to transfer the pattern of the photo-mask 300 onto the substrate 100. These initial steps result in a remaining photo-resist area 240 being retained on the substrate 100. The substrate 100 defines circular exposed portions 220 that are not covered by the remaining photo-resist area 240.

FIG. 9 shows the substrate 100 after a first etching step has been performed. Etchant reacts with the exposed portions 220 of the substrate 100 to form large circles 120 of the concentric double-circle patterns. Each large circle 120 has a surface 122.

As indicated in FIGS. 10 and 11, a second photo-resist layer 200 is coated on the substrate 100 including the surfaces 122 of the large circles 120. A photo-mask 400 is provided for use in a second exposing step. The photo-mask 400 includes a plurality of annular transparent areas 420. A light shielding area 440 is defined within each transparent area 420. The remainder of the photo-mask 400 not including the transparent areas 420 and the light shielding areas 440 is defined as a light shielding area 460. Light beams pass through the transparent areas 420 toward the substrate 100. Exposed portions of the remaining photo-resist area 240 that is on the surfaces 122 react accordingly. A second developing step is then performed, in order to transfer the pattern of the photo-mask 400 onto the substrate 100. This results in a remaining photo-resist area 124 being retained on the surface 122 of each large circle 120.

FIG. 12 shows the substrate 100 after etchant has reacted with exposed portions of the large circles 120.

Finally, a photo-resist denuding step is performed to eliminate the remaining photo-resist areas 124, 240. The core with concentric double-circle patterns is thus provided.

However, the above-described conventional method requires two etching steps. Moreover, a precise orientation is necessary when the second exposure step is performed. These requirements make the process unduly complicated and time-consuming, resulting in high operating costs and low productivity.

SUMMARY OF THE INVENTION

Accordingly, an object of the present invention is to provide a method for fabricating a patterned core for a light guide plate, the method being simple and inexpensive.

In order to achieve the object set out above, a method for fabricating a patterned core for a light guide plate comprises the following steps: providing a substrate; coating a photo-resist layer on the substrate; exposing the photo-resist layer to light using a photo-mask, the photo-mask having patterns, wherein a line-width of each pattern is less than that of a corresponding pattern of the patterned core; developing the photo-resist layer; wet etching the substrate; and removing remaining photo-resist from the substrate.

According to the preferred embodiment of the present invention, a core having concentric double-circle patterns is obtained. Because of the isotropic directionality of the wet etching, the horizontal component of the etching can appreciably enlarge a horizontal dimension of each etched area, thereby compensating for the difference in size between each concentric double-circle pattern of the photo-mask and the corresponding concentric double-circle pattern of the finished core. Thus, only one semiconductor process having an exposing, a developing and an etching step is needed to fabricate the desired core having fine concentric double-circle patterns. The process is simple, and reduces operating costs.

Other objects, advantages and novel features of the present invention will be apparent from the following detailed description of preferred embodiments thereof with reference to the attached drawings, in which:

DETAILED DESCRIPTION OF THE INVENTION

A method for fabricating a patterned core for a light guide plate, the core having concentric double-circle patterns, includes the following steps:

First, a substrate 500 is provided. The substrate 500 is rectangular, and is made of a metal with high heat conductivity such as Cu, a Cu alloy or BeCu. Ni, NiCo, NiP, SiC, TiC or Cr is implanted into the substrate 500 in order to increase its rigidity. The substrate 500 is baked in a vacuum or in a nitrogen environment at a temperature between 140° C. and 200° C. to remove water.

Figure 1:
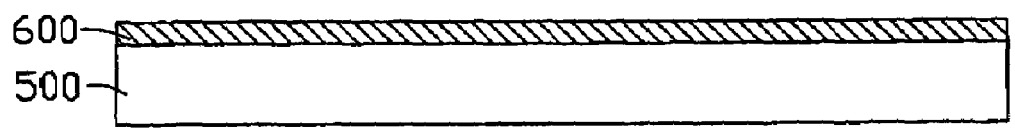
FIG. 1 is a schematic, side cross-sectional view of a photo-resist layer coated on a substrate according to the method of the present invention.

Second, referring to FIG. 1, a photo-resist layer 600 is coated on the substrate 500. The photo-resist layer 600 is an organic, positive photo-resist such as Bakelite™. In an alternative embodiment, a negative photo-resist can be used. The method of coating the photo-resist material is spin-coating or spray-coating. Then, a soft-bake step is performed. That is, the substrate 500 with the photo-resist layer 600 is baked on a cushion at a temperature between 90° C. and 100° C. for 20~30 minutes.

Figure 2:
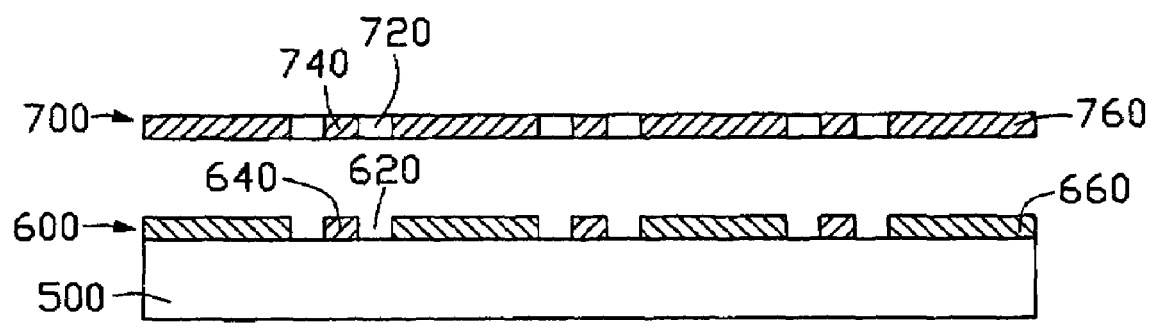
FIG. 2 is a similar to FIG. 1, but also showing a photo-mask above the substrate, and the photo-resist layer changed after exposure and development has been performed using the photo-mask.
Figure 3:
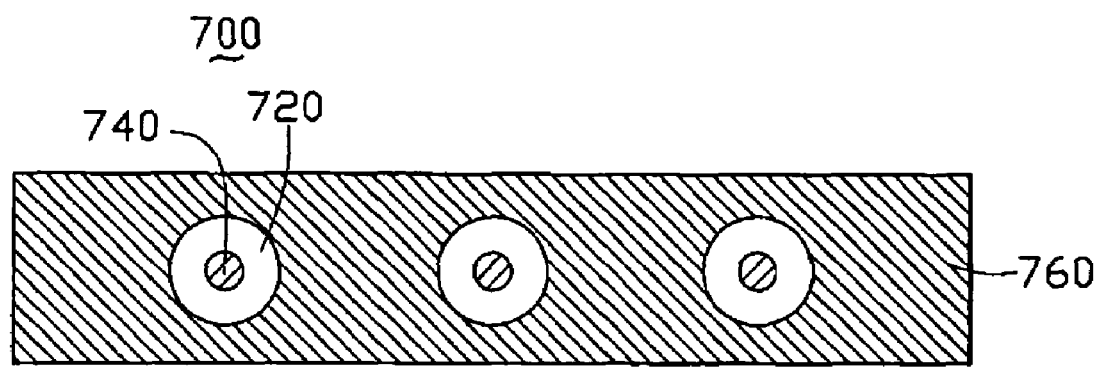
FIG. 3 is a schematic, top cross-sectional view of the photo-mask of FIG. 2.

Third, referring to FIGS. 2 and 3, the substrate 500 is exposed and developed using a photo-mask 700 having predetermined patterns. The photo-mask 700 includes a plurality of concentric double-circle patterns. Each concentric double-circle pattern defines a small circle and a concentric large circle. An annular transparent area 720 is defined between the small circle and the large circle. A light shielding disc area 740 is defined within the small circle. The remainder of the photo-mask 700 not including the annular transparent areas 720 and the light shielding disc areas 740 is defined as a light shielding area 760. A line-width of each concentric double-circle pattern of the photo-mask 700 is appreciably less than the corresponding concentric double-circle pattern of the desired core, in order to compensate for horizontal etching inherent in a subsequent isotropic wet etching step performed. The photo-mask 700 is parallel with the substrate 500. The light source of the exposure is an ultraviolet radiation source, and the method of exposure is projection exposing. In the exposure, parts of the photo-resist layer 600 that receive light beams react to become capable of being dissolved by a developer. After exposure, the substrate 500 is baked on a cushion at a temperature between 100° C. and 120° C. for 20~30 minutes; that is, a hard-baking step is performed.

Fourth, a developer is sprayed onto the substrate 500, which is then kept static for 30~60 seconds. As shown in FIG. 2, this results in annular developed areas 620 being formed in the photo-resist layer 600. A remaining photo-resist area 640 is defined in the middle of each developed area 620. The remainder of the photo-resist layer 600 not including the developed areas 620 and the remaining photo-resist areas 640 is defined as a remaining photo-resist area 660.

Figure 4:
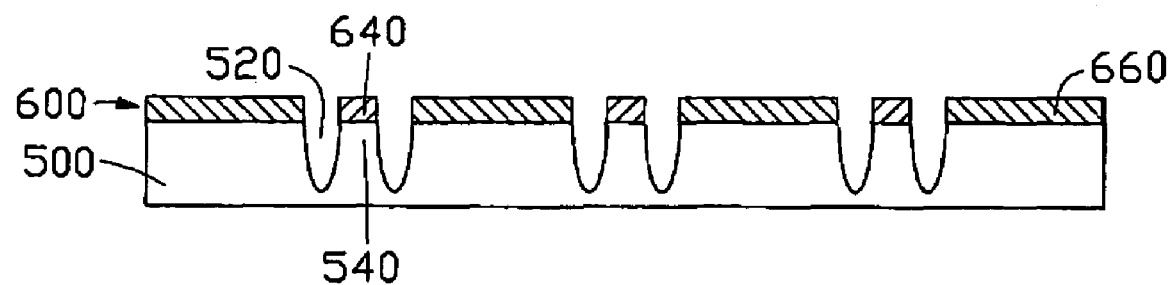
FIG. 4 is a similar to FIG. 2, but showing the substrate when etching is performed thereon.

Fifth, referring to FIGS. 2 and 4, a wet etching step is performed. The etchant is hydrofluoric acid. Wet etching is substantially isotropic etching; that is, horizontal etching and vertical etching are substantially identical. The etchant is sprayed onto the substrate 500 and reacts with uncovered portions of the substrate 500. As the reaction proceeds, double-circle structures of the core are formed. Each double-circle structure includes an inner circle and a concentric outer circle. The inner circle defines a remaining area 540 therewithin, and an area between the inner circle and the outer circle defines an etched area 520.

Figure 5:
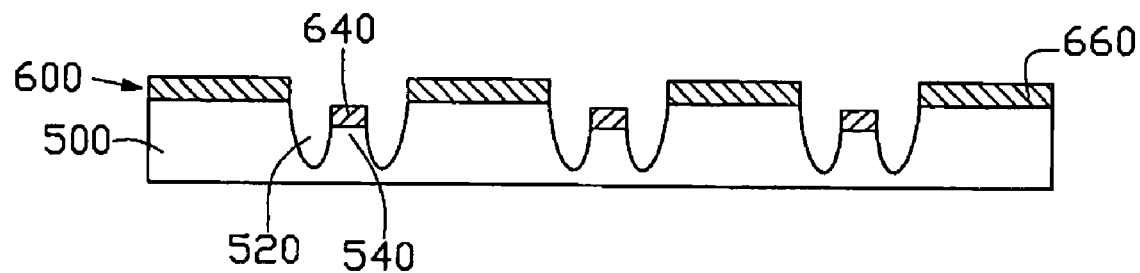
FIG. 5 is similar to FIG. 4, but showing the substrate after etching has been completed.
Figure 6:
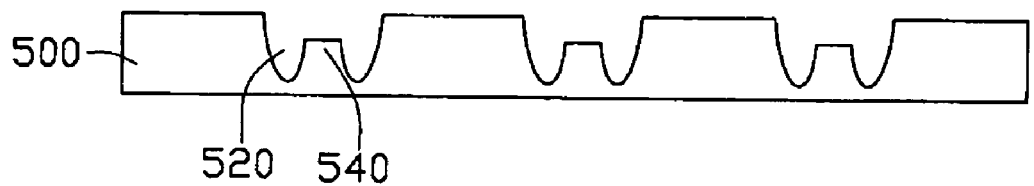
FIG. 6 is similar to FIG. 5, but showing the substrate after remaining photo-resist areas have been removed therefrom, thus yielding a core having concentric double-circle patterns.
Figure 7:
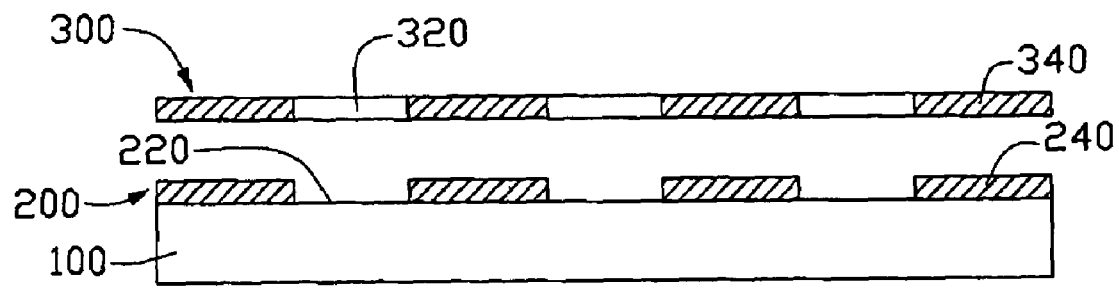
FIG. 7 is a schematic, side cross-sectional view of a substrate having a photo-resist layer thereon changed after a first exposing and developing step has been performed according to a conventional method for fabricating a patterned core for a light guide plate, and also showing a first photo-mask above the substrate, the first photo-mask being used for the first exposing.
Figure 8:
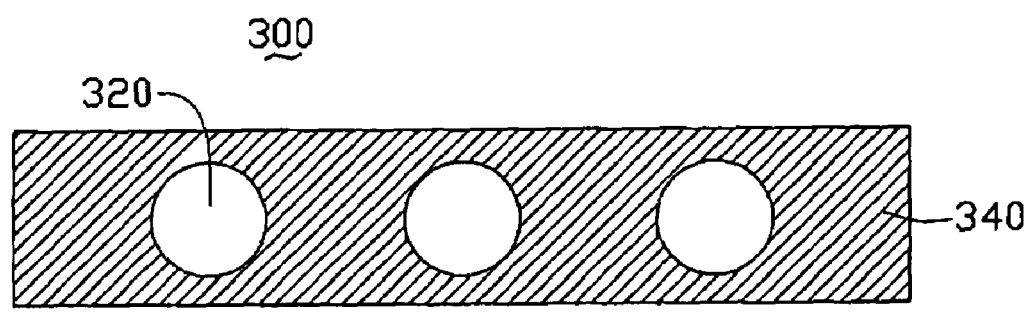
FIG. 8 is a schematic, top cross-sectional view of the first photo-mask of FIG. 7.
Figure 9:
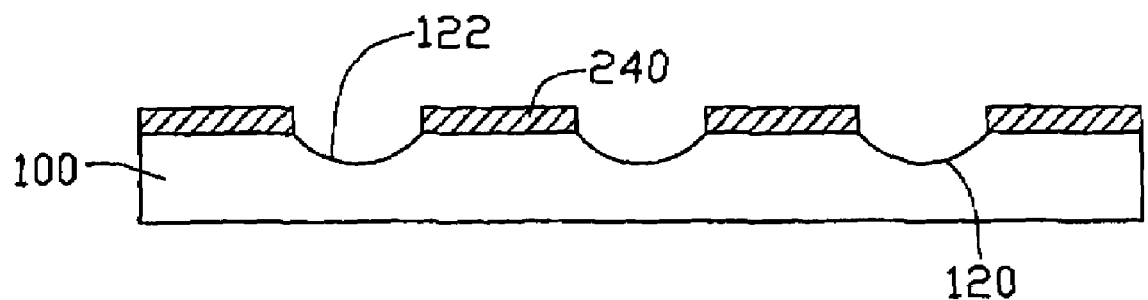
FIG. 9 is a similar to the substrate shown in FIG. 7, but showing the substrate after a first etching step has been performed.
Figure 10:
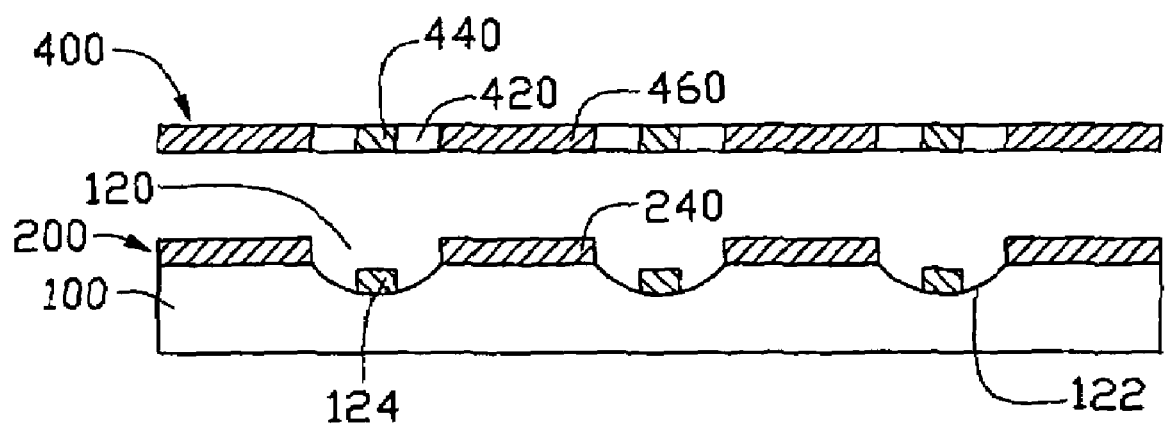
FIG. 10 is a schematic, side cross-sectional view showing the substrate of FIG. 9 with its photo-resist layer changed after a second exposing and developing step has been performed according to said conventional method, and also showing a second photo-mask above the substrate, the second photo-mask being used for the second exposing.
Figure 11:
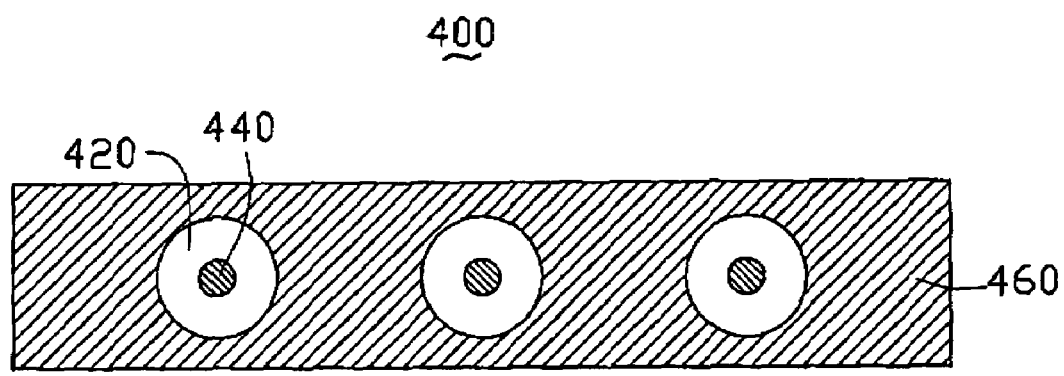
FIG. 11 is a schematic, top cross-sectional view of the second photo-mask of FIG. 10.
Figure 12:
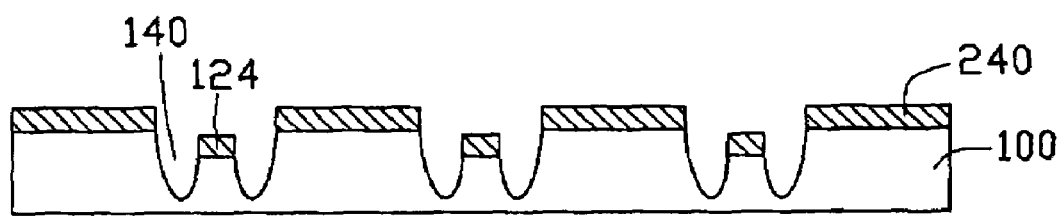
FIG. 12 is a similar to the substrate shown in FIG. 10, but showing the substrate after a second etching step has been performed.

Referring to FIG. 5, because of the horizontal etching, top portions of the remaining area 540 are etched out. Moreover, the line-width of each etched area 520 grows larger until it is equal to that of the desired core. A concentric double-circle pattern is thus formed on the substrate 500.

Sixth and finally, a denuding solution is coated on the surface of the substrate 500 in order to react with the remaining photo-resist areas 640,660. Once the remaining photo-resist areas 640,660 are removed, this leaves the desired core having the concentric double-circle patterns.

According to the present invention, because of the isotropic directionality of the wet etching, the horizontal component of the etching can appreciably enlarge a horizontal dimension of each etched area, thereby compensating for the difference in size between each concentric double-circle pattern of the photo-mask and the corresponding concentric double-circle pattern of the finished core. Thus, only one semiconductor process having an exposing, a developing and an etching step is needed to fabricate the desired core having fine concentric double-circle patterns. The process is simple, and reduces operating costs.

It is to be understood that even though numerous characteristics and advantages of the present invention have been set out in the foregoing description, together with details of the steps and function of the invention, the disclosure is illustrative only, and changes may be made in detail, especially in matters of arrangement of steps within the principles of the invention to the full extent indicated by the broad general meaning of the terms in which the appended claims are expressed.

I claim:

1. A method for fabricating a patterned core for a light guide plate, comprising:
   providing a substrate;
   coating a photo-resist layer on the substrate;
   exposing the photo-resist layer to light using a photo-mask, the photo-mask having patterns, wherein a line-width of each pattern is less than that of a corresponding pattern of the patterned core and wherein the patterns of the light guide plate are concentric double-circle patterns;
   developing the photo-resist layer;
   wet etching the substrate; and
   removing remaining photo-resist from the substrate.

2. The method for fabricating a patterned core for a light guide plate as recited in claim 1, wherein the substrate is made of a metal with high heat conductivity.

3. The method for fabricating a patterned core for a light guide plate as recited in claim 1, wherein the photo-resist layer is spray-coated on the substrate.

4. The method for fabricating a patterned core for a light guide plate as recited in claim 1, wherein the photo-resist layer is spin-coated on the substrate.

5. The method for fabricating a patterned core for a light guide plate as recited in claim 1, wherein the photo-resist layer comprises positive photo-resist.

6. The method for fabricating a patterned core for a light guide plate as recited in claim 1, wherein the photo-resist layer comprises negative photo-resist.

7. The method for fabricating a patterned core for a light guide plate as recited in claim 1, further comprising soft-baking the substrate and photo-resist layer after coating the photo-resist layer on the substrate.

8. The method for fabricating a patterned core for a light guide plate as recited in claim 1, further comprising hard-baking the substrate and photo-resist layer after developing the photoresist layer.

9. A method for fabricating a patterned core for a light guide plate, comprising:
   providing a substrate;
   coating a photo-resist layer on the substrate;
   exposing the photo-resist layer to light using a photo-mask, the photo-mask having concentric double-circle patterns;
   developing the photo-resist layer;
   baking the photo-resist layer for a period sufficient to cause hardening thereof;
   wet etching the substrate; and
   removing remaining photo-resist from the substrate.

* * * * *